(12) United States Patent
Poykko (10) Patent No.: US 7,412,207 B2
(45) Date of Patent: Aug. 12, 2008

(54) SIGNAL PATH DETECTION FOR WIRELESS NETWORKS INCLUDING REPEATERS

(75) Inventor: Sami Poykko, Espoo (FI)

(73) Assignee: Nokia Corporation, Espoo (FI)

( * ) Notice: Subject to any disclaimer, the term of this patent is extended or adjusted under 35 U.S.C. 154(b) by 388 days.

(21) Appl. No.: 10/518,505

(22) PCT Filed: Jun. 21, 2002

(86) PCT No.: PCT/IB02/03198

§ 371 (c)(1),
(2), (4) Date: Jan. 31, 2005

(87) PCT Pub. No.: WO04/002182

PCT Pub. Date: Dec. 31, 2003

(65) Prior Publication Data

US 2005/0221754 A1     Oct. 6, 2005

(51) Int. Cl.
*H04B 7/15* (2006.01)
(52) U.S. Cl. .................. 455/11.1; 455/20; 455/23; 455/424; 455/456.5; 455/561; 455/95; 370/315; 370/492; 370/501
(58) Field of Classification Search ............... 455/11.1, 455/7, 20, 23, 424, 452.1, 456.1, 456.5, 561, 455/95; 370/95.1, 214, 315, 329, 335, 342, 370/349, 350, 492, 501
See application file for complete search history.

(56) References Cited

U.S. PATENT DOCUMENTS 5,260,943 A * 11/1993 Comroe et al. ............... 370/332
6,415,155 B1 * 7/2002 Koshima et al. ........... 455/456.1
6,839,539 B2 * 1/2005 Durrant et al. .............. 455/11.1
7,039,418 B2 * 5/2006 Amerga et al. ............ 455/456.1

FOREIGN PATENT DOCUMENTS

WO    WO 01/99444 A1    12/2001
WO    WO 02/17669 A1    2/2002

OTHER PUBLICATIONS

Spirito et al, "Experimental Performance of Methods to Estimate the Location of Legacy Handsets in GSM" IEEE VTS 54th Vehicular Technology Conference, 2001. VTC 2001, Oct. 7-11, 2001, vol. 4, pp. 2716-2720.

* cited by examiner

*Primary Examiner*—Matthew Anderson
*Assistant Examiner*—Shaima Q. Aminzay
(74) *Attorney, Agent, or Firm*—Squire, Sanders & Dempsey L.L.P.

(57) ABSTRACT

There is disclosed a method of determining the path of a signal between a donor network element and a remote station, the donor network element being associated with at least one repeater, comprising the steps of: receiving at the remote station a plurality of signals associated with a plurality of network elements; calculating an estimate of the distance between the remote station and each network element, including an estimate of the distance between the remote station and each repeater associated with the donor network element; determining the one of said estimates of the distance between the donor network element and at least one, associated repeater and remote station which most closely approximates to the distance between the other network elements and the remote station; and selecting that donor network element/repeater to be the source of the signal.

29 Claims, 3 Drawing Sheets

SIGNAL PATH DETECTION FOR WIRELESS NETWORKS INCLUDING REPEATERS

FIELD OF THE INVENTION

The present invention relates to a technique for determining the signal path of a signal transmitted in a wireless network where there is a possibility of repeaters existing in the signal path, and particularly but not exclusivly to a technique for determining the location of a mobile station in the network in dependence on said path determination.

BACKGROUND TO THE INVENTION

Networks using repeaters for re-transmision of information are well-known. In wireless networks such as cellular wireless networks, it is known to provide repeaters for signals transmitted from base transceiver stations. In such arrangements the radio signal transmitted by a base transceiver station is received by a repeater and is re-transmitted by the repeater. A base transceiver station having a repeater associated therewith is known as a donor base transceiver station. A donor base transceiver station may be asscociated with a plurality of repeaters.

The existence of the repeaters in the cellular network leads to problems for a mobile station (MS) location calculation utilizing the network information (such as base transceiver station (BTS) coordinates).

In a normal network there is no direct indication in a signal as to whether it has been transmitted directly by the donor BTS or by an associated repeater. Any signal from a repeater 'looks' like it has simply come from the associated donor BTS.

Thus the signals obtained by the MS give no indication as to whether they are from the donor BTS or an associated repeater. As such, reliable and accurate determination of the MS location based on such measurements on signals is difficult. Whilst the unit calculating the MS location knows the location of the donor BTS and associated repeaters, it does not know from which one the measurements were obtained.

It is therefore an aim of the present invention to provide a technique suitable for determining the path traveled by a signal transmitted using a donor BTS, and thereby determine the point of transmission of the signal measured by MS.

It is a further aim of the present invention to use the path determination to provide an accurate location estimate for a mobile station receiving signals originating from the donor BTS.

SUMMARY OF THE INVENTION

According to the present invention, there is provided a method of determining the path of a signal between a donor network element and a remote station, the donor network element being associated with at least one repeater, comprising the steps of: receiving at the remote station a plurality of signals associated with a plurality of network elements, calculating an estimate of the distance between the remote station and each network element, including an estimate of the distance between the remote station and each repeater associated with the donor network element; determining the one of said estimates of the distance between the donor network element and at least one associated repeater and remote station which most closely approximates to the distance between the other network elements and the remote station; and selecting that donor network element/repeater to be the source of the signal.

The step of calculating an estimate of the distance between the remote station and each network element preferably comprises: selecting each one of the donor network elements and at least one repeater in turn as the source of the signal; and performing said calculating step for only the selected one of the donor network element and at least one repeater.

The step of calculating the estimate of the distance preferably includes estimating the location of the remote station and thereby estimating an actual distance between each donor network element/repeater and the remote station.

The step of calculating the estimate of the distance preferably includes measuring physical quantities at the remote station, and thereby estimating a model distance between each network element/repeater and the remote station.

The measured physical quantity preferably includes the measurement, at the remote station, of one or all of: a time delay in a received signal; attenuation in a received signal or received signal strength.

The step of estimating the actual distances preferably further comprises summing the estimated actual distances.

The step of estimating the model distances preferably further comprises summing the model distances.

The method may further include calculating a scale factor in dependence on the summed actual and model distances.

The scale factor may be determined to adapt the scaled sums to be equal. The scale factor may be determined by dividing the summed actual estimates by the summed model estimates.

The model distances estimates may be modified in dependence on said scale factor to produce a set of modified model distances.

The model distances may be scaled by the scaling factor to produce the modified model distances.

The method may further include calculating a difference value for each donor network element and at least one repeater by summing the difference between each estimate and each modified model estimate obtained for each respective donor network element and at least one repeater.

The signal may be determined to be transmitted from the donor network element or at least one repeater having the lowest difference value.

A plurality of signals may be received from a donor network element, wherein all steps are repeated for each such signal to determine a source of each signal.

The method may further comprise the step of calculating the location of the remote station in dependence on the determined source of the signal.

The remote station may be a mobile station and the donor network element is a donor base station.

According to a further aspect of the present invention there is provided a network device adapted to determine the path of a signal between a donor network element and a remote station, the donor network element being associated with at least one repeater, comprising means for calculating an estimate of the distance between the remote station and each network element, including an estimate of the distance between the remote station and each repeater associated with the donor network element, based on a plurality of signals received at a mobile station; means for determining the one of said estimates of the distance between the donor network element and at least one associated repeater and remote station which most closely approximates to the distance between the other network elements and the remote station; and means for selecting that donor network element/repeater to be the source of the signal.

The remote station may be a mobile station and the network element may be a base station.

The means for calculating an estimate of the distance between the remote station and each network element may include: means for selecting each one of the donor network elements and at least one repeater in turn as the source of the signal; and means for performing said calculating step for only the selected one of the donor network element and at least one repeater.

The means for calculating the estimate of the distance may include means for estimating the location of the remote station and thereby estimating an actual distance between each donor network element/repeater and the remote station.

The means for calculating the estimate of the distance may include means for measuring physical quantities at the remote station, and thereby estimating a model distance between each network element/repeater and the remote station.

The measured physical quantity may include the measurement, at the remote station, of one or all of: a time delay in a received signal; attenuation in a received signal or received signal strength.

The means for estimating the actual distances may further comprise means for summing the estimated actual distances.

The means for estimating the model distances may further comprise means for summing the model distances.

The network device may further include means for calculating a scale factor in dependence on the summed actual and model distances.

The means for calculating the scale factor may be adapted to convert the scaled sums to be equal.

The scale factor may be determined by dividing the summed actual estimates by the summed model estimates.

The model distances estimates may be modified in dependence on said scale factor to produce a set of modified model distances.

The model distances may be scaled by the scaling factor to produce the modified model distances.

The network device may further include means for calculating a difference value for each donor network element and at least one repeater, including a summer for summing, the difference between each estimate and each modified model estimate obtained for each respective donor network element and at least one repeater.

The signal may be determined to be transmitted from the donor network element or at least one repeater having the lowest difference value.

A plurality of signals may be received from a donor network element, wherein all steps are repeated for each such signal to determine a source of each signal.

The network device may further comprise means for calculating the location of the remote station in dependence on the determined source of the signal.

The invention thus defines a novel mechanism for detecting a used signal path in the case of the presence of repeaters in a wireless network such as a cellular network. The invention particularly describes a mechanism that can be used to detect if the signal received by the mobile station is originating directly from a donor BTS or if the signal has been re-transmitted by a repeater associated with the donor BTS. For the case of multiple repeaters connected to the same BTS the mechanism can be used to detect which one of the repeaters (or donor ITS) has been used to deliver the signal to the MS. The process can be used to detect the signal path for both the serving BTS and neighboring BTS(s). The knowledge of the used signal path advantageoulsy increases location accuracy.

The mechanism preferably uses a location algorithm, which calculates a location estimate for an MS using a delivered measurement report and network information. The invention does not make any assumptions about the location algorithm used, or limit the invention to the use of a specific algorithm, except that the location algorithm preferably makes use of information and related measurements from at least two BTSs.

The invention also preferably uses a "model for the measurement". A model for the measurement is preferably required to be able to deliver an estimate for a distance between the MS and a BTS based on measurement information and network information from the corresponding BTS. Generally a model for the measurement may be an empirical physical model for the measured physical quantity (for example, propagation time delay or propagation attenuation).

BRIEF DESCRIPTION OF THE FIGURES

The invention will now be described by way of example with reference to the following figures, in which.

DESCRIPTION OF THE PREFERRED EMBODIMENTS

Figure 1:
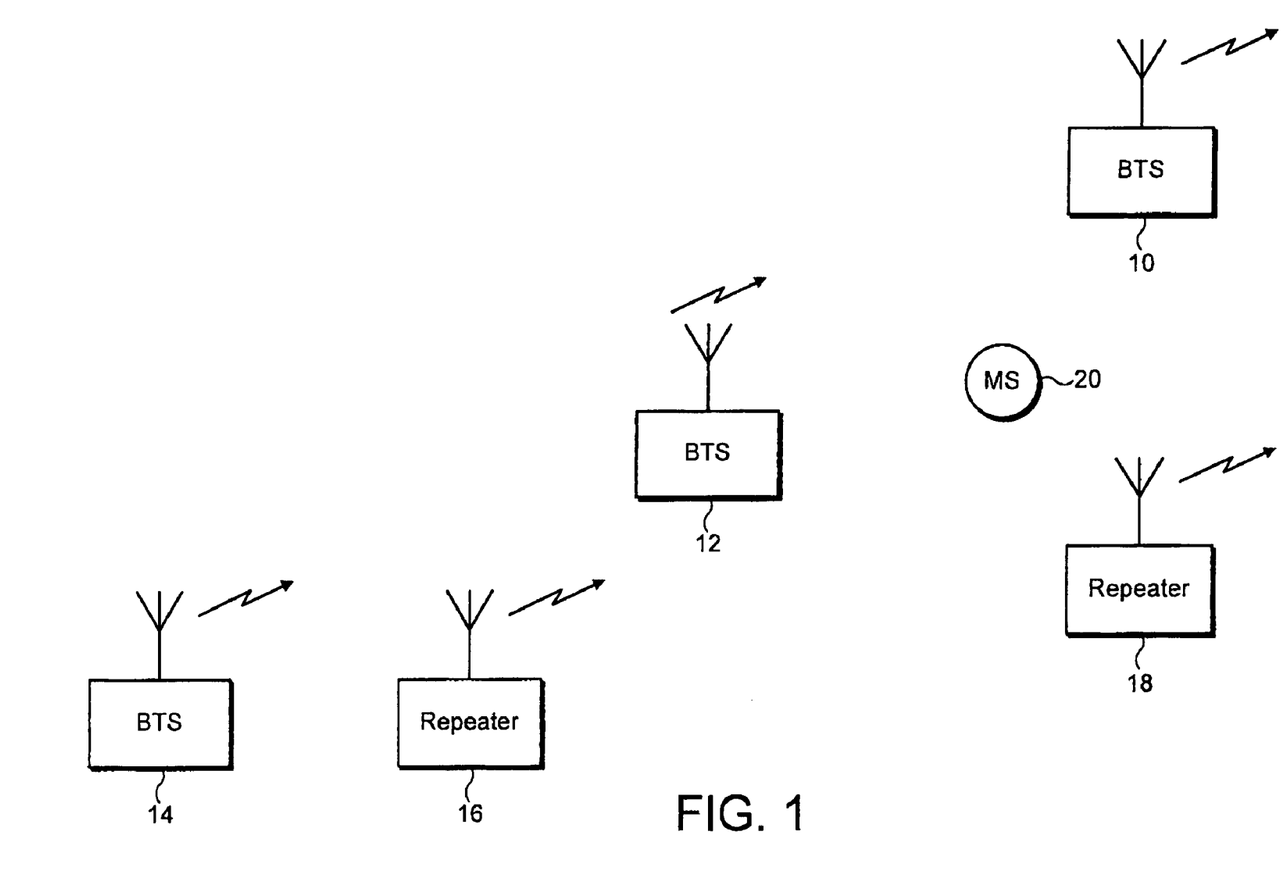
FIG. 1 illustrates an example wireless network environment including a donor base transceiver station associated with a plurality of repeaters, within such network the present invention may be utilised.

FIG. 1 illustrates an exemplary mobile communications system environment in which the present invention may be utilised. However, the present invention is not limited to such an environment, and the more general applicability of the present invention will become apparent on reading the following description.

Referring to FIG. 1, the mobile communications system includes a first base transceiver station (BTS) BTS1 (10), a second base transceiver station BTS2 (12), and a third base transceiver station BTS3 (14). The third base transceiver station 14 is associated with a first repeater 16 and a second repeater 18, the third base transceiver station 14 being a donor base station for the repeaters 16 and 18. A mobile station (MS) 20 receives radio signals from one or all of the base transceiver base stations or the repeaters.

As is well-known in the art, the network infrastructure is designed such that repeaters 16 and 18 provide signals for the BTS 14 in geographical areas not reached directly by the BTS 14. The location of each of the BTSs 10, 12, 14 and the repeaters 16, 18 is known by the network, and more particularly is known by the means for calculating the location of the MS. For the purposes of the present description it is assumed that the means for calculating the location of the MS, the 'location calculation unit', is provided in the network. However the invention is not limited to such, and it will be understood by one skilled in the art that the location calculation unit may be alternatively located, e.g. in the MS itself.

FIG. 1 is not drawn to scale. FIG. 1 is merely intended to convey an example scenario where an MS receives a signal from at least one repeater.

In accordance with this embodiment of the present invention, and for the purposes of describing the present invention, it is assumed that the mobile station 20 receives radio signals from each of the base transceiver stations 10, 12 and from the repeater 18. In principle it should be the case that the MS measures the signal only from the donor BTS or one of the repeaters (ie. the signal from a particular BTS has only one physical signal path). In the example of FIG. 1 the physical path is from the BTS 14, to the repeater 16, to the repeater 18, and to the MS 20.

As is well known in the art each of the base transceiver stations 10, 12, and 14 transmit control signals, which are received by the mobile station 20. The control signals include information that is used by the network for determining which BTS should serve the MS. Such techniques are well known in the art. Repeaters, where provided, also re-transmit the control signals. The mobile station 20 is connected to one of the base stations 10,12,14 for the purposes of a call connection. Any connection to the base station 14 may be via one of the repeaters 16,18.

Figure 2:
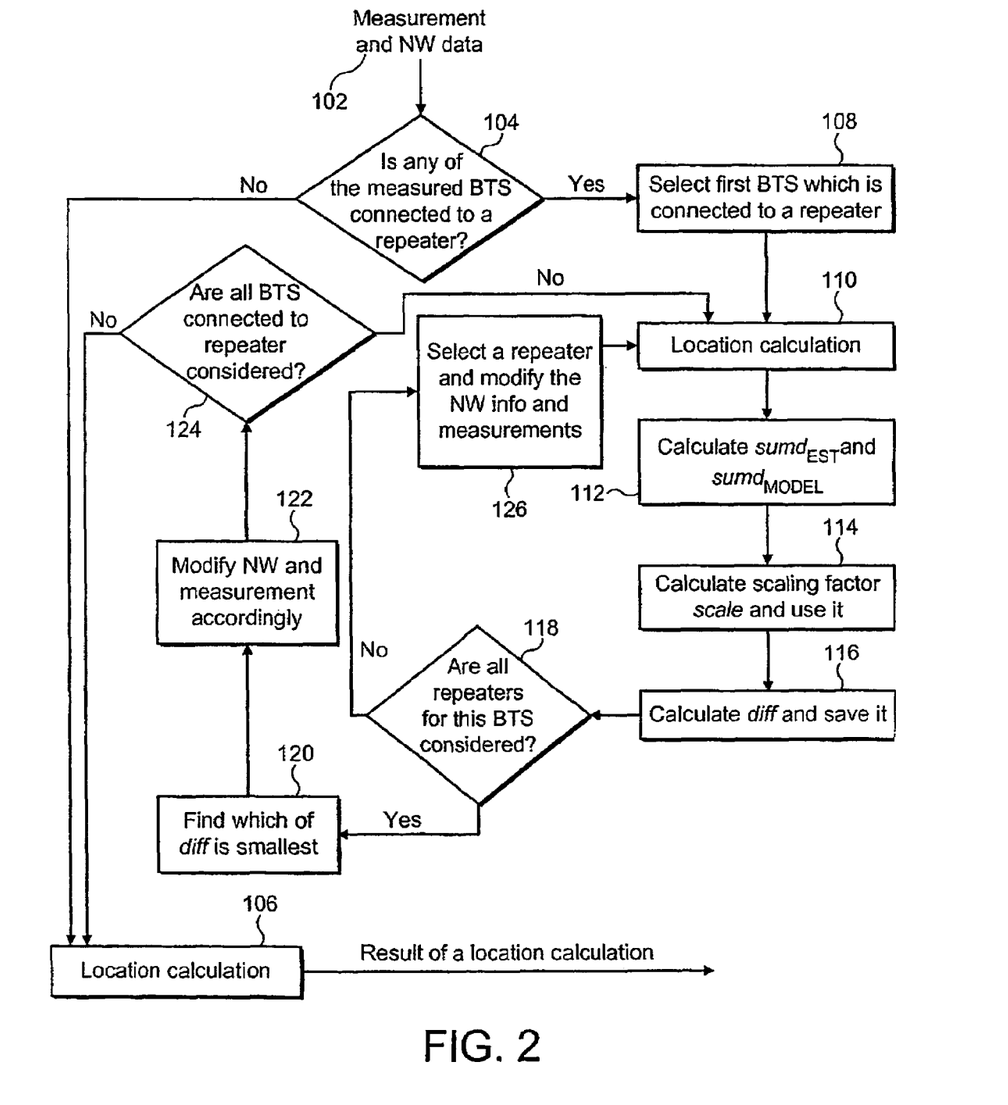
FIG. 2 illustrates an example embodiment of the present invention.

Referring to FIG. 2, the operation of a preferred embodiment of the invention for determining the correct signal path for signals from the donor BTS 14, and preferably to accurately determine the location of the MS 20, is described.

In a first step, 102, the mobile station 20 receives control signals on the air interface from all base transceiver stations and repeaters within radio range. As discussed above, in the present example this comprises the base transceiver base stations 10, 12 and the repeater 18. Based on these received signals, the MS 20 provides to the network measurement information which is used by the location calculation unit.

In a step 104, the location calculation unit determines whether control signals have been received which are associated with any base transceiver station which is connected to one or more repeaters. The network stores information as to whether any BTS is a donor BTS, and therefore can determine this information based on the BTS identity in the information returned from the MS.

If in step 104 it is determined that no base transceiver stations are associated with repeaters, then the location calculation unit (location calculation server) moves to step 106 and a location calculation is performed as is well known in the art.

In the present embodiment it is determined that the MS has received signals from one donor base transceiver station, 14. The location calculation unit then moves to a step 108, in which a first base transceiver station associated with a repeater is selected. In the present embodiment only one base transceiver base station is associated with a repeater, and so that base transceiver station is selected. Where more than one base transceiver station is associated with a repeater, then a first base transceiver station may be selected in a number of possible ways, for example on a random selection or on the basis of the strongest received signal.

Once the donor BTS is selected in step 108, in this embodiment BTS 14, the measurement and network data information associated with that BTS is stored, and the measurements kept unchanged for the purpose of the following steps.

In a step 110, a location estimate is calculated using a known location algorithm. The location algorithm may make use of all the measurement and network data information that has been delivered to the location calculation unit from all BTSs/repeaters, but may also only be partly based on that information. This location algorithm may be the same as utilized in step 106.

The location algorithm in step 110 thus preferably uses the information from all BTSs whether or not connected to the repeater. For those which are already studied (in accordance with the following steps) the best estimate for the signal path is used.

As such, after step 108 the location calculation unit has calculated an estimate of the MS physical location, i.e. has determined a location estimate.

Thereafter, in a step 112, the location calculation unit calculates additional estimates and model values as described in more detail hereinafter.

1. Firstly, an estimated distance $d_{EST}^i$ between the obtained location estimate (obtained in step 108) and each BTS is calculated. Thus for each base station, based on an estimate of the MS location, the location calculation unit determines an estimate of the distances between the mobile station 20 and each of the base stations 10, 12, 14. The information about the location of each BTS is known. Thus a set of distance estimates is calculated.

2. Secondly, an estimated model distance $d_{MODEL}^i$ between each BTS 10, 12, 14 and the MS 20 is calculated using a "model for the measurement". In selecting the model for the measurement, information about the order of magnitude for the distance between each BTS and the MS location estimate may be used. Also the information about the direction from the BTS to an MS location estimate may be used in the calculation of $d_{MODEL}^i$. Thus a set of model distances is calculated.

The model distances are calculated on the basis of a measured physical quantity, using a physical model. The measured physical quantity may, for example, be a measure of the time delay in the signal received at the MS, or a measure of the attenuation in the signal received at the MS.

The location calculation algorithm in step 110 may use the model distances calculated herein as part of the basis for the location calculation. These model distances do not give any information relating to the direction of received signals, which is also needed in the location algorithm.

3. Thirdly, the sum of the distance estimates is calculated, $$sumd_{EST} = \sum_{i=1}^{NBTS} d_{EST}^i,$$

where NBTS is the number of measured BTS delivered to the location algorithm in paragraph 1 above. In this example, NBTS=3.

4. Fourthly, the sum of the model distances is calculated, $$sumd_{MODEL} = \sum_{i=1}^{NBTS} d_{MODEL}^i.$$

Thereafter, in a step 112, the sum values calculated in step 110 are utilised to calculate a scaling factor, $$Scale = \frac{sumd_{EST}}{sumd_{MODEL}}.$$

This scaling factor is provided as most of the available models for the measurements, for use in step 2 above, have a number of empirical parameters.

The scaling factor is then used in step 112 to provide a set of modified model distances. That is, the values calculated in step 2 of step 112 are modified using the scaling factor to obtain a new set of model distance estimates: $d_{MOD}^i = Scale \cdot d_{MODEL}^i$. The sum of the model distance estimates $d_{MOD}^i$ may then be calculated, $sumd_{MOD}$, if required.

It should be noted that the use of the scaling factor is not essential to the present invention, but is preferably used to provide more reliable results.

In a step 116, a measure of a difference between $d_{MOD}^i$ and $d_{EST}^i$, diff, is calculated. For example a "variance" measure can be used, $$diff = \sum_{i=1}^{NBTS} (d_{MOD}^i - d_{EST}^i)^2.$$

The use of a variance is only one example for providing a measure of difference. What is important is to provide a value that can be used for comparison purposes. A variance is used herein as an example, as variance is commonly used to describe how much a measured quantity is spread. Alternative possibilities for providing the measure of difference may, for example, be to use the sum of absolute values of differences.

In principle any quantity that does not have a sign associated with it, and is obtained as a difference between the two distances, may be used. The purpose of the measure of difference is to introduce a cost factor that is to be minimized.

Once the measure of difference is determined in step 116, the location calculation unit has determined, for this example, a measure of difference based on the assumption that the MS has received a signal from the donor BTS 14 directly. In a step 118 the location calculation unit determines whether all the repeaters associated with the particular donor BTS 14 have been considered. At this stage, only the BTS itself has been considered, and not any of the repeaters. As such, in the example scenario of FIG. 1, there are still the two repeaters 16 and 18 to consider.

The location calculation unit therefore moves on to step 126, and a repeater is selected. The selection of the repeater may be arbitrary, as all repeaters have to be considered. Once a repeater is selected, then the measurement and network data information for that repeater is selected, i.e. the information associated with the signal from the BTS 14, and the steps 110 to 116 repeated for that repeater.

Note that in step 112 1. above $d_{EST}^i$ for the BTS 14 is now changed to the distance between the new estimate and the corresponding repeater.

On the assumption that the repeater 16 is then processed, thereafter in step 118 it is determined that one repeater remains to be processed, and in step 126 repeater 18 is selected. Repeater 18 is then selected, and processed.

As a result there is determined a measure of difference based on the assumption that the MS has received a signal from the repeater 16, and a measure of difference based on the assumption that the MS has received a signal from the repeater 18.

Thus, in this embodiment, the location calculation unit has calculated a measure of difference for each of: the donor base transceiver station 14, the repeater 16 and the repeater 18.

Thereafter, in step 118, it is determined that all repeaters associated with the particular donor BTS have been considered, and the location calculation unit moves on to step 120.

In step 120, the location calculation unit determines which of the measure of difference values from the donor base transceiver station and each of the repeaters is the smallest. That is, step 120 determines which of the BTS 14 and the repeaters 16, 18 gives rise to the minimum measure for a difference between $d_{MOD}^i$ and $d_{EST}^i$, diff. This is determined by a simple comparison operation.

The invention identifies the smallest measure of difference, as the distribution of the distance from the model for measurements is most heavily peaked around the values that result for the MS location estimate BTS distances. This indicates that they are the least contradicting measurements in the final set used in the location calculation. If, for example, there is just one BTS connected to a repeater, that measurement would be contradicting with the location estimate if the wrong signal path is used in the location estimation. With the correct signal path the measurement from the BTS connected to a repeater does not contradict the location estimate. Similarly, as a location estimate depends on the selected signal path, the same applies to the other BTSs (not connected to repeater).

Thus, it is determined the correct path of the signal received from the BTS 14 is through repeater 18.

By way of further explanation, a simplified example is presented with further references to FIG. 1. In order to illustrate a simple example, a number of simplifying assumptions are made.

As above, it is supposed that the real physical path is via repeater 18. In this case BTS 14 and repeater 16 (as selected signal paths) would give inconsistent results. The measurements and the models are considered as exact, in this example, for simplicity. In summary, selecting the signal path via the repeater 18 would give a correct distance (repeater 18 to MS distance), selecting the path via repeater 16 would give an incorrect distance (for repeater 16 to MS) and similarly also for BTS 14 to MS. Any measurements show that the MS is slightly closer to the BTS 10 than to BTS 12, and that BTS 10 to MS distance is roughly the same as repeater 18 to MS distance. If it is assumed that each repeater is amplifying the signal so that it is transmitted from the repeater at the same signal strength as from the donor BTS; the measurement from BTS 14 always indicates the distance between MS and repeater 18, regardless the selected signal path.

Consider the Three Possible Scenarios:

1. The signal is assumed to originate directly from BTS 14.

The measurements indicate that the MS is equally close to BTS 10 and 14, but significantly (~20%) further away from BTS 12. As can be seen from FIG. 1, there is no location where such measurements could be obtained. Since BTS 14 is significantly far away. Therefore the measure of difference is large.

2. The signal is assumed to originate from repeater 16.

The measurements again indicate that the distance to the MS is the same from BTS 10 and repeater 16, but roughly ~20% larger to the BTS 12. It is possible that there exists such a point where these values can be obtained (with the MS in a different position to that shown in FIG. 1) However that point would be further away from BTS 10, BTS 12 and repeater 16 than the actual MS location is, therefore the location algorithm needs to make some compromise between optimizing the actual distances, and relative correctness of the distances. Again the resulting measure of difference is non-zero.

3. The signal is assumed to originate from repeater 18.

The actual MS location perfectly matches to the distances from each BTS/repeater. The measure of the difference is therefore zero. In practice, the method may not always find the correct signal path, as the measurement errors and non-ideal location algorithms may make the situation complicated. Inclusion of the scaling factor (step 114) does improve the reliability of the method.

In step 122, the location calculation unit selects the network information and modifies the measurements for the one of the BTS 14 and repeaters 16,18 which returned the lowest measure of difference.

The measurements sent to location algorithm should only correspond to the path between MS and the one selected donor/repeater. The modifications are carried out to delete the effect of the donor-repeater path (e.g. to delete the extra time from the measurement, or to calculate the strength of signal at the actual transmitting antenna (donor/repeater). Thus the modifications may consider the repeater gain, losses in the path from a donor, extra delays introduced by a repeater, and for indoor repeater assumption that the signals from the other BTS are coming outside can be made etc. Various possible considerations for modifying the measurements will be apparent to one skilled in the art. These modifications are outside the scope of the present invention.

If the selected signal path is directly via donor BTS no modifications are performed.

After the modification in step 122, in a step 124 the location calculation unit determines whether all donor base transceiver stations, i.e. every BTS connected to repeater(s), has been considered. If there are still donor BTSs to be considered, then all the above described steps 108 to 122 are repeated.

In the present example, there are no further donor BTSs, and the location calculation unit moves to step 106. In step 106 the location calculation unit calculates a final location estimate.

The location algorithm receives a set of known locations (BTS coordinates or repeater coordinates) and corresponding measurements and other Network information. Based on this information the location algorithm calculates a location estimate. For each BTS which can be connected to a repeater only one path is delivered to the location algorithm, and that path is selected in accordance with the present invention.

In this final location determination step, the location calculation unit produces more accurate/reliable results, because the selection of the signal path is more accurate.

If the location algorithm used in the location calculation step 110 of FIG. 2 is idealistically perfect (thereby providing a location estimate with no error), and the model for the measurement used in step 112 of FIG. 2 is perfect (i.e. giving an exact distance calculation), the value $d_{EST}^i$ is equal to the value $d_{MODEL}^i$ for each BTS for the case of the correct signal path, where any data received from the repeater (if the correct path is not directly from the BTS) is modified accordingly. Furthermore the value $d_{EST}^i$ would not be equal to $d_{MODEL}^i$ for (at least) some BTSs in the case of the wrong signal path used in the calculation.

In practice the location algorithm (step 110) does not give perfect location estimates with no error, nor does the model for the measurement (step 112) deliver exact ideal distances. However selecting the signal path leading to minimum discrepancy between the two sets of distances (a measure of the discrepancy is calculated in the step 116 of FIG. 2) is inherently most consistent and provides the selection of the actually used signal path with high probability.

If more than one kind of measurement is available for any BTS the same process can be utilized, but the model for the measurement has to be selected accordingly. That is, the step 2 of step 112 may be modified in dependence on the specific information available in any given implementation.

If history data for the measurements is available, then the measure for the difference in step 112 may preferably be calculated from all available history data.

Figure 3:
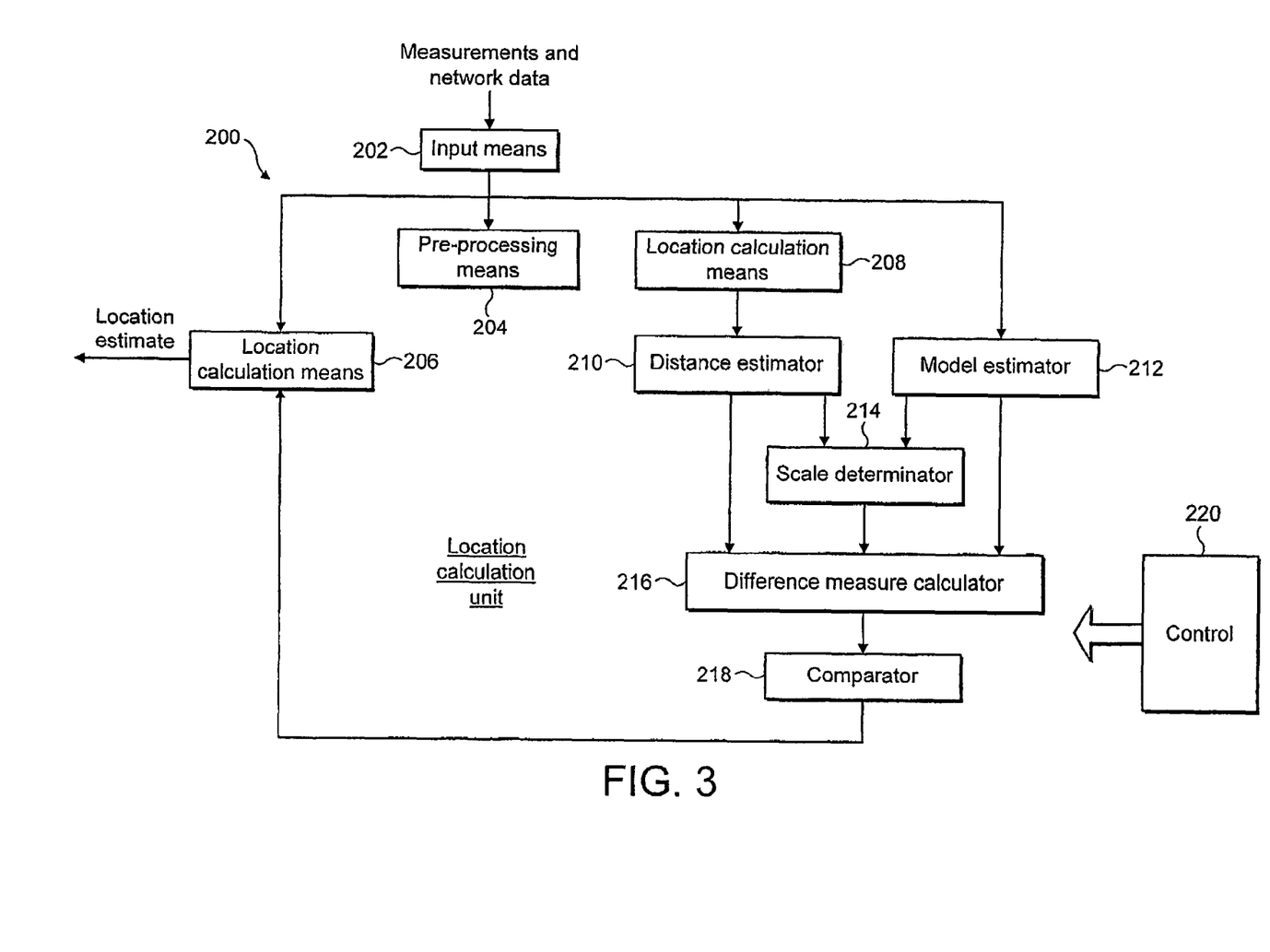
FIG. 3 illustrates an example architecture of a network element for implementing the present invention.

Referring to FIG. 3, for completeness there is illustrated in an example architecture of a network element for implementing the present invention as described in the preferred embodiment hereinabove. As mentioned hereinabove, the present invention is preferably implemented in a network element, although it will be apparent to one skilled in the art that it may alternatively be implemented elsewhere, for example in a mobile station.

Referring to FIG. 3, the network element includes an input means 202, a pre-processing means 204, a location calculation means 206, and further location calculation means 208, a distance estimator 210, a model estimator 212, a scale determinator 214, a difference measure calculator 216, a comparator 218 and a control block 220.

The location calculation unit of FIG. 3, generally designated by reference numeral 200, receives measurements and network data at the input means 202. The pre-processing means 204, in conjunction with a control block 220, performs the operation of method step 104. The location calculation means 208 performs the function of method step 110. The distance estimator block 210 and the model estimator block 212 perform the respective parts of method step 112, namely calculating the distance estimates and model estimates. The scale determinator 214 performs the method step 114 of determining the scale. The difference measure calculator 216 performs method step 116, and calculates the difference measurement. The comparator block 218 performs method step 120 to determine which difference measurement is the smallest, after the control block 220 in conjunction with the pre-processing means 204 has determined whether all the repeaters for the particular base transceiver station have been considered in method step 118.

The control block 220 controls the various elements of the location calculation unit 200 to repeat various method steps, if further base transceiver stations need to be considered. The control block 220 also carries out any necessary modification to network and measurements corresponding to the method step 122.

The location calculation means 206 performs the final location calculation method step 106, and outputs the location estimate.

It will be apparent to one skilled in the art how the various functional blocks of FIG. 3 correspond to the method steps of FIG. 2, and how the method of FIG. 2 is implemented using the example location calculation unit of FIG. 3.

There has thus been described a technique for determining the signal path of a signal received by a mobile station transmitted from a donor base transceiver station or a repeater associated therewith, which signal path information may be used by the location calculation unit in order to provide a more accurate estimate for the location of the mobile station.

The invention can thus be used to detect the correct signal path if repeaters exist in the network for all measured cells. The invention can be applied even with minimum information available from the network cells. The invention does not introduce any new parameters. The implementation of the invention is straightforward and it can be easily added to existing products. The invention is not restricted for a particular location algorithm or particular type of measurements, and thus the invention may be utilised in a wide range of situations.

The present invention has been described herein with reference to a specific network example. The invention is not limited to such an example and may be more broadly applied. Similarly the invention has been described herein with specific reference to an exemplary embodiment. Not all aspects of this embodiment are essential to the present invention. The scope of the present invention is defined in the appended claims.

The invention claimed is:

1. A method comprising:
   determining a path of a signal between a donor network element and a remote station, the donor network element being associated with at least one repeater, the determining comprising:
      receiving at the remote station a plurality of signals associated with a plurality of network elements;
   calculating an estimate of the distance between the remote station and each network element, based on the received plurality of signals, including an estimate of the distance between the remote station and each repeater associated with the donor network element, wherein the calculating of the estimate of the distance includes estimating the location of the remote station and thereby estimating an actual distance between each donor network element and the remote station and estimating an actual distance between each repeater and the remote station, and wherein the calculating of the estimate of the distance further includes measuring physical quantities at the remote station, and thereby estimating a model distance between each network element and the remote station and estimating a model distance between each repeater and the remote station;
   calculating a difference value for each donor network element and at least one repeater by summing the difference between each actual distance estimate and each model distance estimate obtained for each respective donor network element and at least one repeater;
   determining that the signal is transmitted from the donor network element or at least one repeater having the lowest calculated difference value; and
   selecting the donor network element or repeater having the lowest calculated difference value be the source of the signal.

2. A method according to claim 1, wherein the calculating of the estimate of the distance between the remote station and each network element further comprises:
   selecting each one of the donor network elements and at least one repeater in turn as the source of the signal; and
   performing said calculating for only the selected one of the donor network element and at least one repeater.

3. A method according to claim 1 wherein the measured physical quantity includes the measurement, at the remote station, of at least one of: a time delay in a received signal; attenuation in a received signal; and received signal strength.

4. A method according to claim 3 wherein the estimating the actual distances further comprises summing the estimated actual distances.

5. A method according to claim 4 wherein the estimating the model distances further comprises summing the model distances.

6. A method according to claim 5 further including calculating a scale factor in dependence on the summed actual and model distances.

7. A method according to claim 6 wherein the scale factor is determined to adapt the scaled sums to be equal.

8. A method according to claim 7 wherein the scale factor is determined by dividing the summed actual estimates by the summed model estimates.

9. A method according to claim 7 wherein the model distances estimates are modified in dependence on said scale factor to produce a set of modified model distances.

10. A method according to claim 9 wherein the model distances are scaled by the scaling factor to produce the modified model distances.

11. A method according to claim 10 wherein the calculating of a difference value for each donor network element and at least one repeater includes summing the difference between each actual distance estimate and each modified model distance estimate obtained for each respective donor network element and at least one repeater.

12. A method according to claim 1 wherein a plurality of signals are from a donor network element, wherein all steps are repeated for each such signal to determine a source of each signal.

13. A method according to claim 1, further comprising calculating the location of the remote station in dependence on the determined source of the signal.

14. A method according to claim 1 wherein the remote station is a mobile station and the donor network element is a donor base station.

15. An apparatus comprising:
   a distance estimate calculator configured to calculate an estimate of a distance between the remote station and each network element, including an estimate of a distance between the remote station and each repeater associated with the donor network element, based on a plurality of signals received at a mobile station,
   wherein the distance estimate calculator includes an estimator configured to estimate the location of the remote station and thereby estimate an actual distance between each donor network element and the remote station, and estimate an actual distance between each repeater and the remote station, and
   wherein the distance estimate calculator further includes a measurer configured to measure physical quantities at the remote station, and thereby estimate a model distance between each network element and the remote station and estimate a model distance between each repeater and the remote station;
   a difference value calculator configured to calculate a difference value for each donor network element and at least one repeater, including a summer configured to sum the difference between each actual distance estimate and each model distance estimate obtained for each respective donor network element and at least one repeater;
   a lowest difference determiner configured to determine that the signal is transmitted from the donor network element or at least one repeater having the lowest calculated difference value; and
   a selector configured to select the donor network element or repeater having the lowest calculated difference value to be the source of the signal to determine the path of the signal between the donor network element and the remote station.

16. An apparatus according to claim 15, wherein the remote station is a mobile station and the network element is a base station.

17. An apparatus according to claim 15 wherein the distance estimate calculator includes:
   a source selector configured to select each one of the donor network elements and at least one repeater in turn as the source of the signal; and
   a performer configured to perform said calculating for only the selected one of the donor network element and at least one repeater.

18. An apparatus according to claim 15 wherein the measured physical quantity includes the measurement, at the remote station, of at least one of: a time delay in a received signal; attenuation in a received signal; and received signal strength.

19. An apparatus according to claim 18 wherein the estimator further comprises a summer configured to sum the estimated actual distances.

20. An apparatus according to claim 19 wherein the estimator further comprises a summer configured to sum the model distances.

21. An apparatus according to claim 20 further including a scale factor calculator configured to calculate a scale factor in dependence on the summed actual and model distances.

22. An apparatus according to claim 21 wherein the scale factor calculator configured to calculate the scale factor is further configured to convert the scaled sums to be equal.

23. An apparatus according to claim 22 wherein the scale factor is determined by dividing the summed actual estimates by the summed model estimates.

24. An apparatus according to claim 22 wherein the model distances estimates are modified in dependence on said scale factor to produce a set of modified model distances.

25. An apparatus according to claim 24 wherein the model distances are scaled by the scaling factor to produce the modified model distances.

26. An apparatus according to claim 25 wherein the difference value calculator includes a summer configured to sum the difference between each actual distance estimate and each modified model distance estimate obtained for each respective donor network element and at least one repeater.

27. An apparatus according to claim 15 wherein a plurality of signals are received from a donor network element, wherein all steps are repeated for each such signal to determine a source of each signal.

28. An apparatus according to claim 15, further comprising a location calculator configured to calculate the location of the remote station in dependence on the determined source of the signal.

29. An apparatus, comprising:

means for calculating an estimate of a distance between a remote station and each of a plurality of network elements, including an estimate of the distance between the remote station and each of a plurality of repeaters associated with a respective one of the plurality of network elements, based on a plurality of signals received at a mobile station, wherein the means for calculating the estimate of the distance includes means for estimating the location of the remote station and thereby estimating an actual distance between each donor network element and the remote station and estimating an actual distance between each repeater and the remote station, and wherein the means for calculating the estimate of the distance further includes means for measuring physical quantities at the remote station and thereby estimating a model distance between each network element and the remote station and estimating a model distance between each repeater and the remote station;

means for calculating a difference value for each donor network element and at least one repeater, including a summer for summing the difference between each actual distance estimate and each model distance estimate obtained for each respective donor network element and at least one repeater;

means for determining that the signal is transmitted from the donor network element or at least one repeater having the lowest difference value; and means for selecting the network element or repeater having the lowest difference value to be the source of the signal.

* * * * *